United States Patent
Kloft et al.

(10) Patent No.: US 11,002,298 B2
(45) Date of Patent: May 11, 2021

(54) DAMPING DEVICE

(71) Applicants: HYDAC TECHNOLOGY GMBH, Sulzbach/Saar (DE); AIRBUS OPERATIONS GMBH, Hamburg (DE)

(72) Inventors: Peter Kloft, Ransbach-Baumbach (DE); Herbert Baltes, Losheim (DE); Robert Marinus Behr, Weyhe (DE); Frank Thielecke, Buxtehude (DE); Arne Waitschat, Hamburg (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 503 days.

(21) Appl. No.: 15/766,864

(22) PCT Filed: Sep. 29, 2016

(86) PCT No.: PCT/EP2016/001620
§ 371 (c)(1),
(2) Date: Apr. 9, 2018

(87) PCT Pub. No.: WO2017/063729
PCT Pub. Date: Apr. 20, 2017

(65) Prior Publication Data
US 2018/0306215 A1    Oct. 25, 2018

(30) Foreign Application Priority Data
Oct. 12, 2015    (DE) .................. 10 2015 013 281.4

(51) Int. Cl.
*F15B 21/00*    (2006.01)
*F16L 55/053*    (2006.01)
*F04B 39/00*    (2006.01)

(52) U.S. Cl.
CPC ........ *F15B 21/008* (2013.01); *F04B 39/0027* (2013.01); *F16L 55/053* (2013.01)

(58) Field of Classification Search
CPC .... F15B 21/008; F04B 39/0027; F16L 55/053
(Continued)

(56) References Cited

U.S. PATENT DOCUMENTS 4,552,182 A * 11/1985 Graham ................ F16L 55/053
                                                                 138/30
5,070,983 A    12/1991 Leigh-Monstevens et al.
(Continued)

FOREIGN PATENT DOCUMENTS

CA    2454232 A1 *  2/2003 ............ F16L 55/053
DE    43 18 553      12/1994
(Continued)

OTHER PUBLICATIONS

International Search Report (ISR) dated Jan. 20, 2017 in International (PCT) Application PCT/EP2016/001620.

*Primary Examiner* — Forrest M Phillips
(74) *Attorney, Agent, or Firm* — Wenderoth, Lind & Ponack, L.L.P.

(57) ABSTRACT

A damping device, particularly for damping or avoiding pressure surges such as pulses, in hydraulic supply circuits, preferably in the form of a silencer, includes a damping housing that surrounds a damping chamber (19), has at least one fluid inlet (11), has at least one fluid outlet (13) and has a fluid receiving chamber (19) extending between the fluid inlet (11) and the fluid outlet (13). During operation of the device, a fluid flow crosses the damping chamber (19) in a through-flow direction (15), coming from the fluid inlet (11) in the direction of the fluid outlet (13). At least parts of the fluid receiving chamber (19) extend in at least one extension direction transversely with respect to the through-flow direction (15). The fluid receiving chamber (19) immediately (Continued)

adjoins the fluid inlet (11) and the fluid outlet (13) and is delimited by at least one yielding wall part (4).

19 Claims, 4 Drawing Sheets

(58) Field of Classification Search
USPC .......................................................... 181/229
See application file for complete search history.

(56) References Cited

U.S. PATENT DOCUMENTS

| | | |
|---|---|---|
| 6,745,886 B1 | 6/2004 | Rey et al. |
| 8,998,836 B2 * | 4/2015 | Chapman ............ A61M 1/1008 |
| | | 604/4.01 |
| 10,024,478 B2 * | 7/2018 | Kloft ....................... F16L 55/05 |
| 10,100,855 B2 * | 10/2018 | Wuerpel ............. F04B 11/0016 |
| 10,378,564 B2 | 8/2019 | Baltes et al. |
| 2018/0045353 A1 | 2/2018 | Baltes et al. |

FOREIGN PATENT DOCUMENTS

| | | | |
|---|---|---|---|
| DE | 102 17 080 | 8/2003 | |
| DE | 20 2014 006 687 | 11/2014 | |
| DE | 102015003015 A1 * | 9/2016 | .............. F16L 55/04 |
| EP | 1788258 A2 * | 5/2007 | ............ F15B 21/008 |
| EP | 1 944 538 | 7/2008 | |
| EP | 3273092 A1 * | 1/2018 | .............. F16D 48/02 |
| GB | 1 562 709 | 3/1980 | |

* cited by examiner

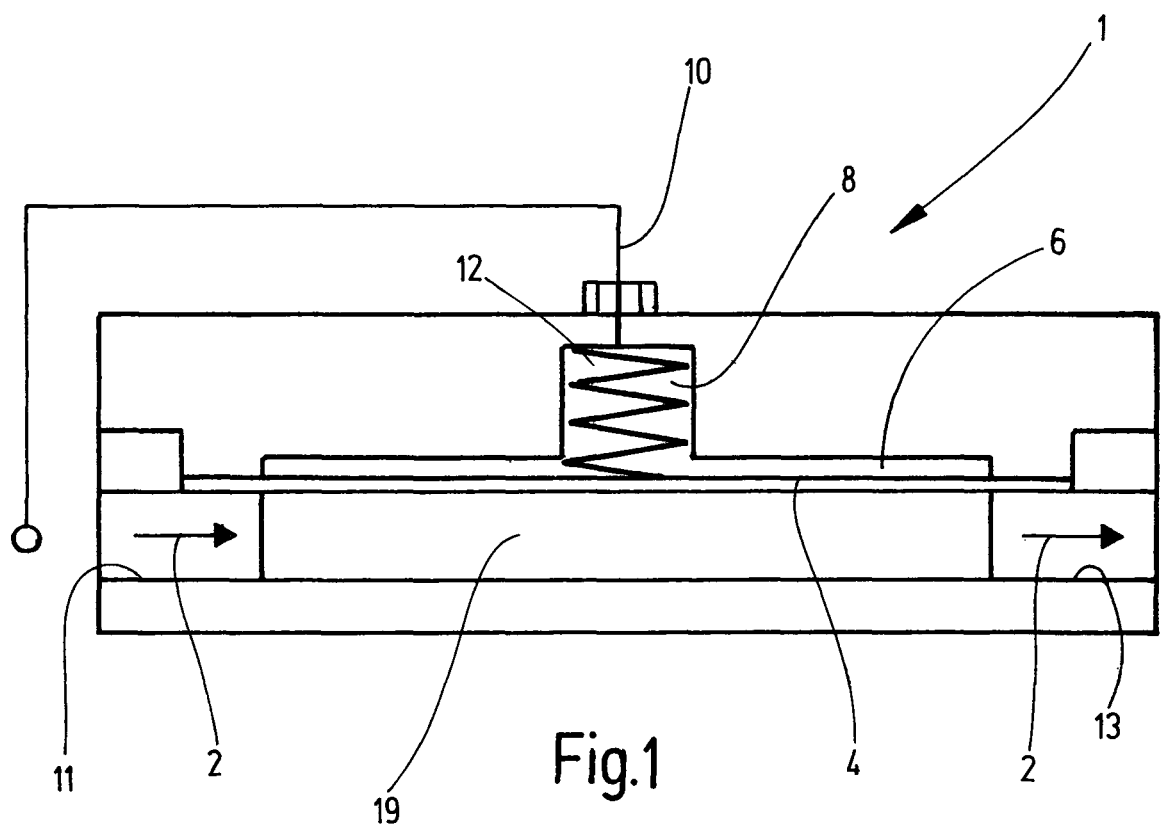

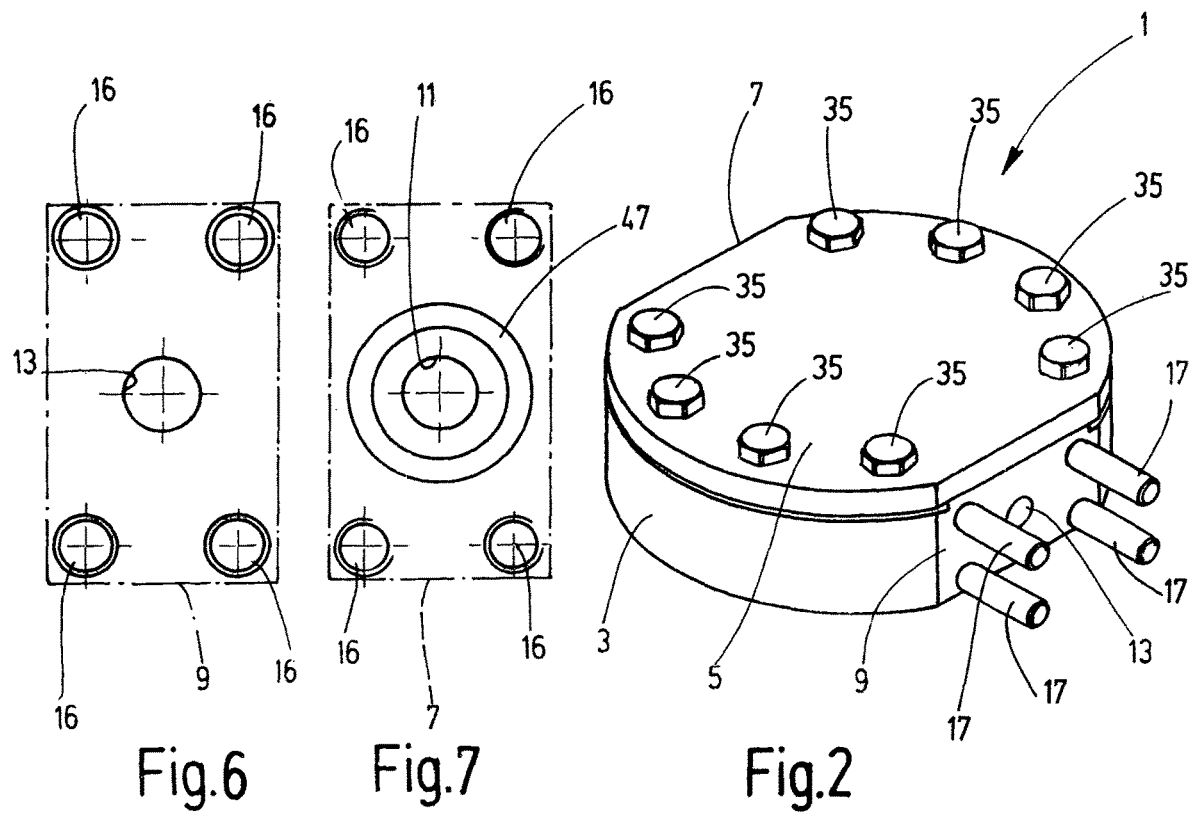
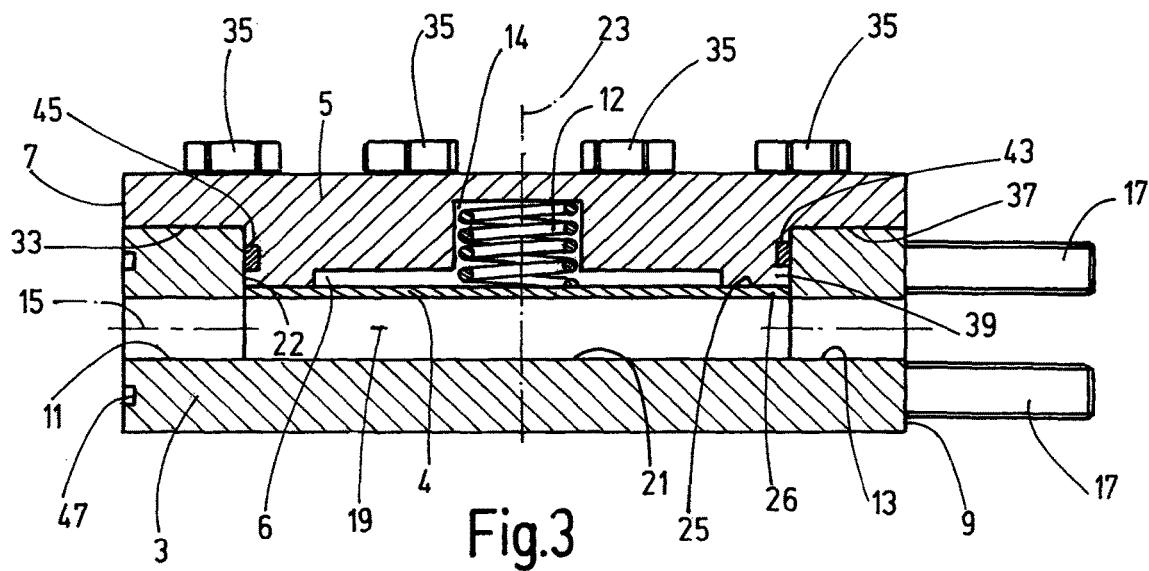

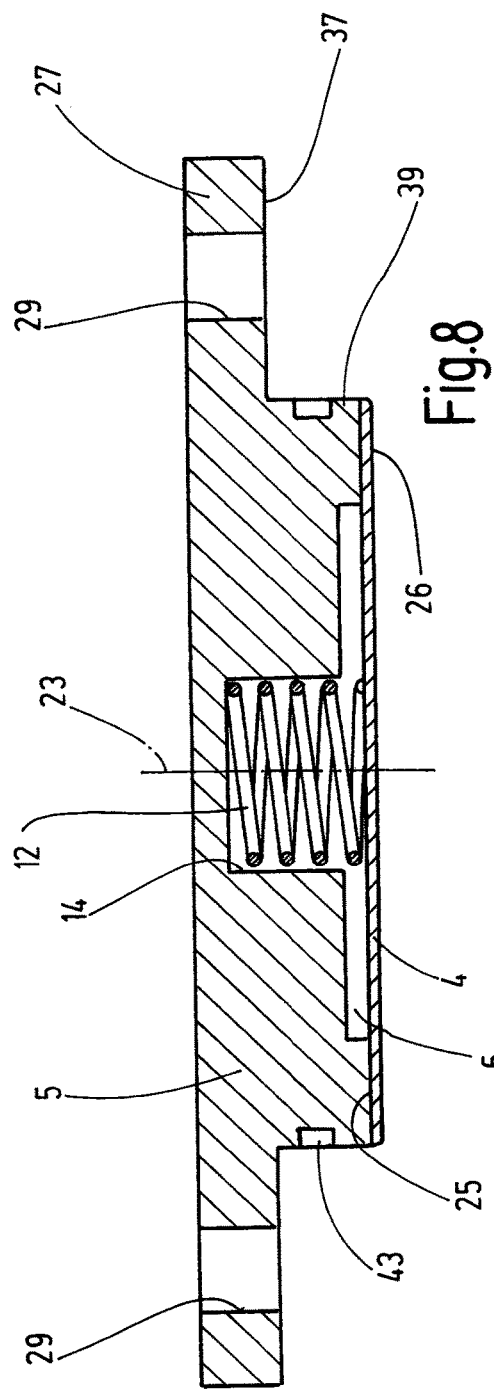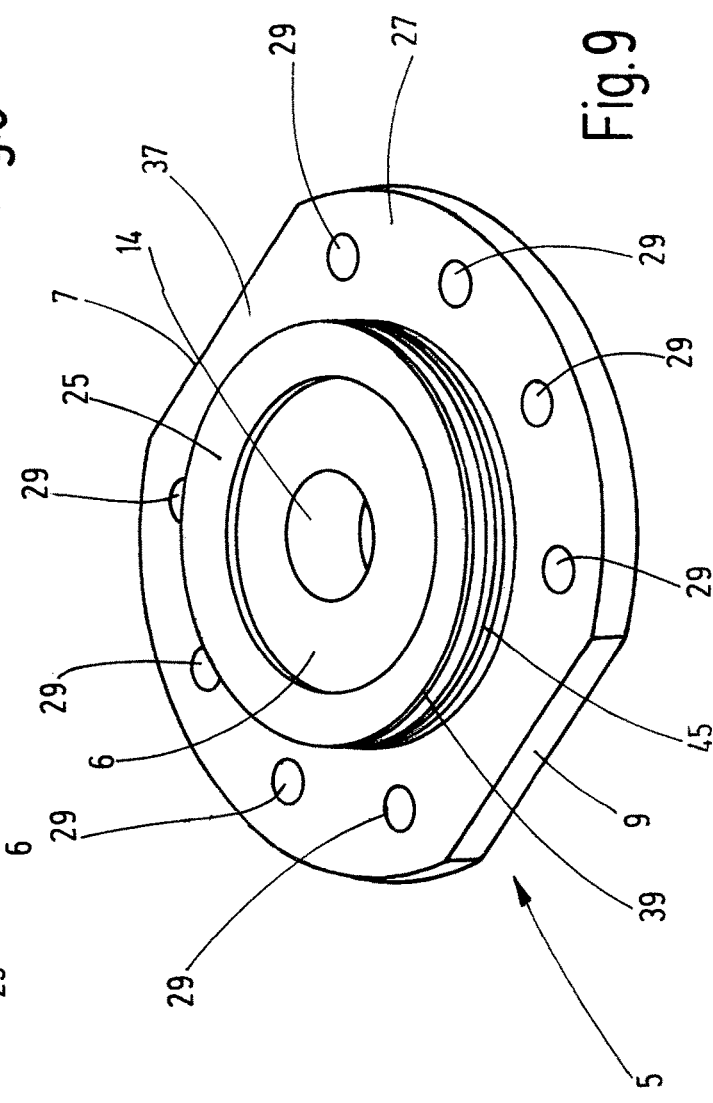

DAMPING DEVICE

FIELD OF THE INVENTION

The invention relates to a damping device, in particular for damping or avoiding pressure surges, such as pulses, in hydraulic supply circuits, preferably in the form of a silencer. The damping device comprises a damping housing surrounding a damping chamber and having at least one fluid inlet, at least one fluid outlet and a fluid receiving chamber that extends between the fluid inlet and the fluid outlet. During operation of the device, a fluid flow crosses the damping chamber in a through-flow direction, coming from the fluid inlet in the direction of the fluid outlet. At least parts of the fluid receiving chamber extend in at least one extension direction transversely with respect to the through-flow direction.

BACKGROUND OF THE INVENTION

Damping devices of this kind are state of the art. Such hydraulic dampers, also referred to as sound dampers or silencers, serve to reduce vibrations produced by pressure pulses, which a corresponding hydraulic system is regularly subject to, in particular as a result of the operation of hydraulic pumps. As described in DE 102 17 080 C1, the known damping devices of this kind have a damping housing in the form of a circular cylinder, which is spherically rounded at both axial end regions. The fluid inlet and the fluid outlet are located coaxial to the cylinder axis on one respective end region. As the damping chamber, which the fluid flow crosses from the fluid inlet to the fluid outlet, a damping tube is provided in these damping devices, which extends coaxially between the fluid inlet and the fluid outlet. The tube wall has openings to the fluid chamber surrounding the tube. In accordance with the cylinder diameter, the fluid chamber is radially expanded relative to the axial through-flow direction defined by the damping tube.

SUMMARY OF THE INVENTION

Given this prior art, the problem addressed by the invention is to provide an improved damping device of the kind considered that, with a simple construction, is distinguished by particularly effective damping performance.

According to the invention, this problem is basically solved by a damping device having, as a significant feature of the invention, a fluid receiving chamber that is immediately adjacent to the fluid inlet and the fluid outlet and is delimited by at least one flexible wall part. With a construction simplified by the elimination of the damping tube, a single cavity forms a resonator system formed from the damping chamber and the fluid chamber together. Because the fluid receiving chamber is delimited by at least one flexible wall part, the device according to the invention is distinguished not only by a simpler construction, but also by increased efficiency with respect to its fluid volume and its weight, with the damping effect being increased in particular in the lower frequency range. Compared with known silencers of this kind, in which an increase in pulses between the pump and the inlet of the silencer can occur, the invention also significantly reduces this risk too.

A particularly efficient damping effect can be achieved in exemplary embodiments in which the fluid receiving chamber forms a disk-shaped hollow space inside the damping housing. This disk shape can be cylindrical or in the form of a polygon or any other shape that is not circular.

The flexible wall part can particularly advantageously be formed by a membrane spanning the disk-shaped hollow space, which membrane separates the fluid receiving chamber in the damping housing from an expansion chamber. The expansion chamber provides free space that allows the membrane certain flexibility.

The arrangement can particularly advantageously be such that a support for the membrane is provided in the expansion chamber. The strength of the support permits adjustment of the stiffness of the membrane, and thus, its damping performance. Alternatively, the thickness of the membrane and/or its material properties can also be selected such that, even without a support, adequate flexibility and elasticity is ensured.

Particularly advantageously, a spring arrangement can be provided as a support of the membrane in the expansion chamber. Instead of or in addition to the spring arrangement, a gas cushion for supporting the membrane can also be provided in the expansion chamber.

In particularly advantageous exemplary embodiments, the arrangement is such that, for support of the membrane, a coupling of the expansion chamber with the fluid side of the damping device is provided. This coupling can be formed by a fluid connection between the fluid receiving chamber and the expansion chamber.

In one particularly advantageous exemplary embodiment of the invention, in which the damping housing is formed from several parts, the following components can be provided:

- a pot-shaped base part, which has a disk-like center recess with a delimiting wall forming a disk surface of the disk-shaped hollow space and with the fluid inlet and the fluid outlet, and
- a flange-shaped cover part that, with an engagement connection piece, engages in a flush manner in the center recess when the cover part is fixed to the base part.

In such exemplary embodiments, it is advantageously possible to form in the cover part for a spring arrangement supporting the membrane a mount for a compression spring. The free end of the spring contacts the membrane spanning the damping chamber and the expansion chamber.

For a pressure-resistant formation of the damping housing, the cover part can have, lying diametrically opposite its vertical axis, several throughholes that, passed through by fixing screws, fix the cover part to the base part.

The fixing screws are preferably arranged, leaving the region of the fluid inlet and fluid outlet free, in a uniform manner along an external circumference on the damping housing, which surrounds the disk-shaped fluid receiving chamber.

For connection with a corresponding hydraulic system, it is possible to provide at the fluid inlet and/or at the fluid outlet on the damping housing a receptacle for a sealing ring, which surrounds the fluid inlet and/or fluid outlet. The damping housing can be fixed in the manner of a fixing block on third components by several fixing bolts, which surround the region of the fluid inlet and/or fluid outlet.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 1 shows a very schematically simplified, sketch-type schematic diagram of a side view of a damper device according to an exemplary embodiment of the invention;

FIG. 2 is a perspective view, scaled down compared with a practical embodiment by a scale of 1:3, of a damping device according to an exemplary embodiment of the invention;

FIG. 3 is a side view in section of the exemplary embodiment that is slightly scaled down compared with a practical embodiment;

FIG. 6 is a partial end view of only the fluid outlet-comprising connection region of the damping housing of the exemplary embodiment;

FIG. 7 is a partial end view of the fluid inlet-comprising connection region of the damping housing of the exemplary embodiment;

FIG. 8 is a side view in section, depicted on a larger scale compared with FIGS. 3 to 5, of only the cover part of the damping housing of the exemplary embodiment; and FIG. 9 is on a smaller scale compared to FIG. 8, a perspective view of the cover part, viewed on the inner side forming an engagement connection piece of the exemplary embodiment.

DETAILED DESCRIPTION OF THE INVENTION

Figure 4:
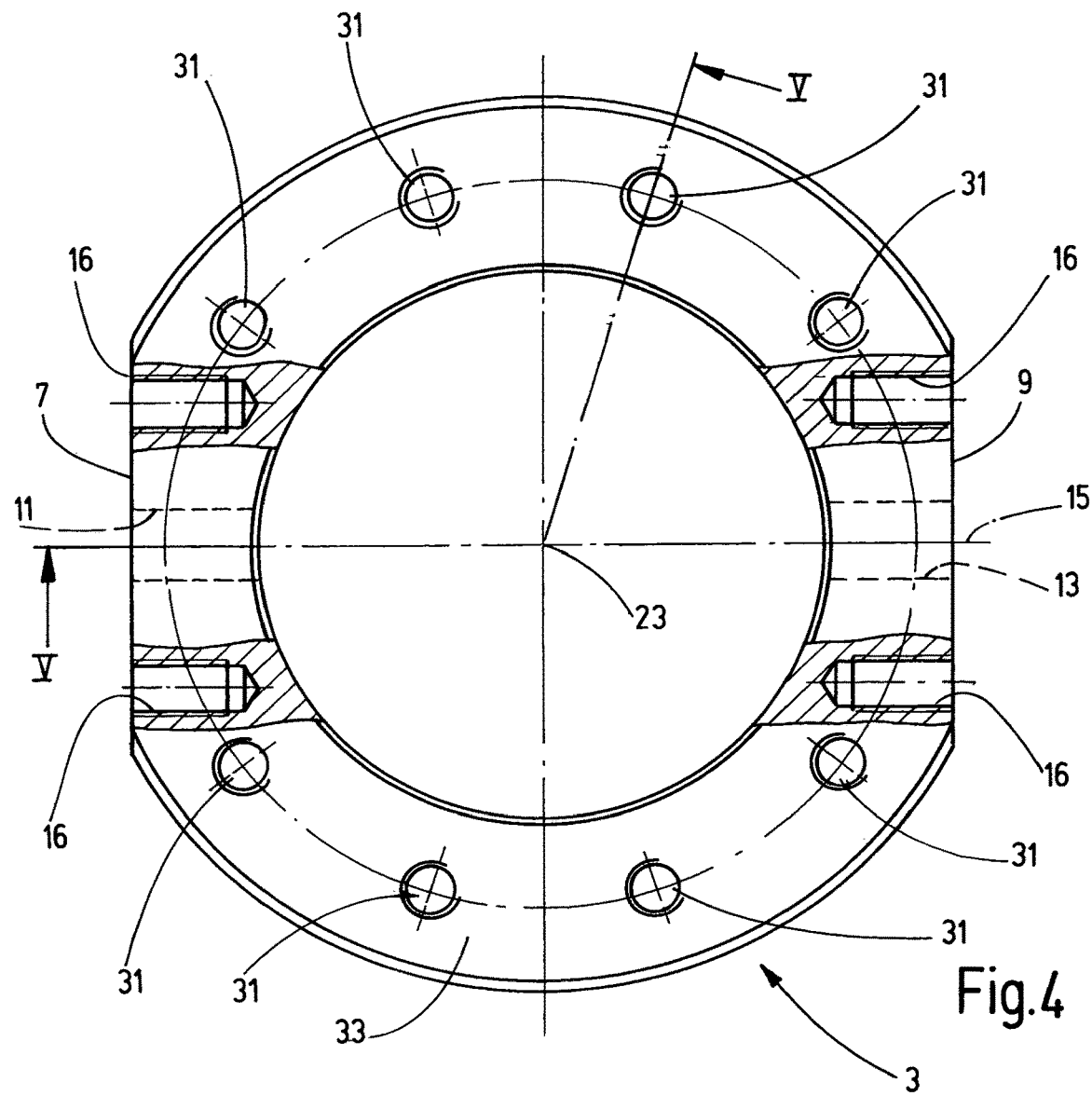
FIG. 4 is a top view, on the scale of FIG. 3, partially in section, of the base part of the damping housing of the exemplary embodiment.
Figure 5:
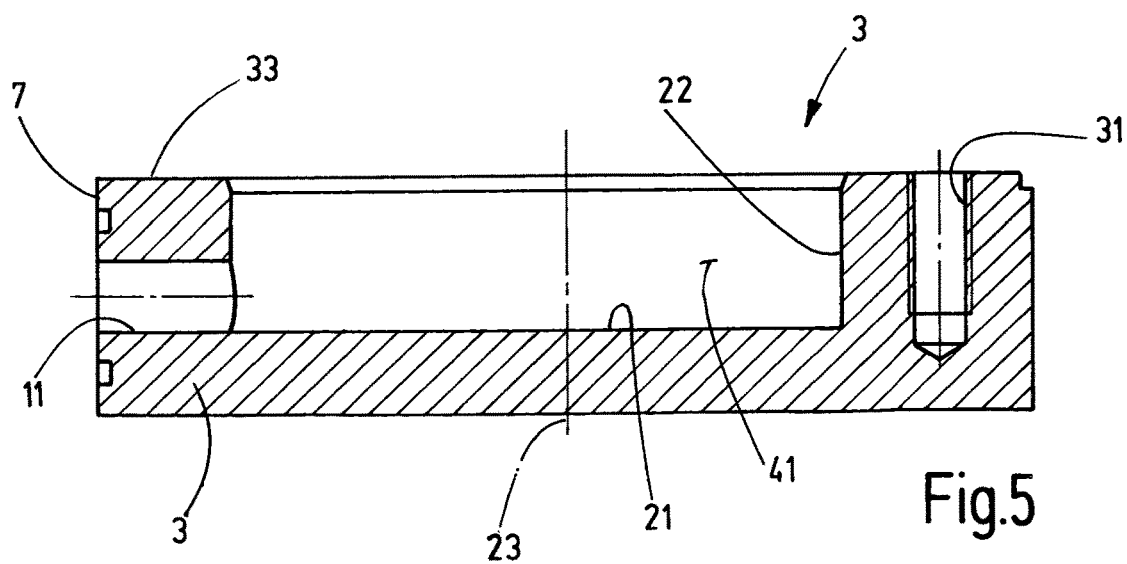
FIG. 5 is a side view in section taken along section line V-V of FIG. 4.

FIG. 1 depicts, in a very schematically simplified depiction, a damping housing 1, which contains a fluid receiving chamber 19, which can be flowed through from a fluid inlet 11, which is immediately adjacent to the fluid receiving chamber 19, to a fluid outlet 13, with the through-flow direction being indicated with flow arrows 2. A delimiting wall of the fluid receiving chamber 19 extending from the fluid inlet 11 to the fluid outlet 13 is formed by a membrane 4, which separates the fluid receiving chamber 19 from an expansion chamber 6. On the side facing the expansion chamber 6, the membrane 4 is supported in the depicted example by a spring arrangement or spring 8. In addition, to generate a pressure cushion formed in the expansion chamber 6 for the membrane, a pressure line 10 is provided, by which the expansion chamber 6 can be supplied with the inlet-side fluid pressure of the damping device or else with a pressure cushion, for example a gas cushion. To obtain the fluid pressure in the expansion chamber 6, the pressure line 10 is connected as a connection line to the line (not depicted) that supplies the fluid inlet 11. The additional FIGS. 2 to 9 depict in greater detail an exemplary embodiment of the damping device according to the invention.

FIGS. 2 and 3 show the exemplary embodiment of the damping device in the assembled state. The damping housing 1 depicted closed in these figures has two main parts, namely a base part 3, which is depicted separately in FIGS. 4 and 5, and a cover part 5, which is depicted separately in FIGS. 8 and 9. The base part 3 and the cover part 5 each have the same contour, so that they are circumferentially flush with one another in the assembled state (FIG. 2), with the contour corresponding to a circular line, which nevertheless has, on two diametrically opposite sides, a planar flattening 5, 7 and 9. The fluid inlet 11 of the damping housing 1 is located in the part of the flattening 7 belonging to the base part 3. The fluid outlet 13 is located in the part of the flattening 9 belonging to the base part 3, with the inlet 11 and the outlet 13 being aligned with the axis of the through-flow direction 15 shown in FIGS. 3 and 4. On each of the flattenings 7 and 9, there are four threaded holes 16, which are arranged in the corner regions of the rectangular flattenings 7 and 9 and which permit the fixing or mounting of the damping housing 1 by threaded bolts 17.

Inside the damping housing 1, the fluid receiving chamber extending between the fluid inlet 11 and the fluid outlet 13, which at the same time acts as a damping chamber, is formed by a cavity in the form of a disk-shaped hollow space 19. It has the form of a circular disk in the form of a flat circular cylinder. One disk surface is delimited by a flat wall 21 in the base part 3 formed like a pot. A central, sunk center recess 41 forms the inner base surface of base part 3. As can be seen most clearly from FIG. 5, the base part 3 delimits with the inner side wall 22 of the pot the circle diameter of the circular disk-shaped hollow space 19 related to the central axis 23. The fluid inlet 11 and fluid outlet 13 are each formed by holes in the flattenings 7 and 9, which open into the hollow space 19 flush with the delimiting wall 21 forming the inner pot base.

In the assembled state, as depicted in FIG. 3, where the cover part 5 engages with a circular cylindrical engagement connection piece 39 in the center recess 41 in the base part 3, the membrane 4 forms the wall part, which delimits the hollow space 19 forming the fluid hollow space on the top side, i.e. on the side lying opposite the wall 21. The membrane 4 lies on a circumferential circular ring surface 25, which forms the inner end surface of the cover part 5. This circular ring surface 25 surrounds the expansion chamber 6, which has the form of a recess concentric to the central axis 23 in the cover part 5. An additional recess 14 located inside the expansion chamber 6, which is likewise concentric to the central axis 23 and which has a smaller diameter than the expansion chamber 6 and extends to the vicinity of the top side of the cover part 5, forms a housing for a screwed pressure spring 12 of the spring arrangement supporting the membrane 14.

In the case of a membrane 4 of a metallic material, the membrane is preferably fixed by a weld joint with its circumferential edge 26 on the circular ring surface 25 of the cover part 5. This joint can be realized by a full penetration welding realized from the outside of the membrane 4 by an electron beam welding process (laser welding). In the case of a membrane 4 of an elastomer, an adhesive joint with the circular ring surface 25 can be provided. In the assembled state, cf. FIG. 3, the membrane 4 extends as the top delimiting wall of the hollow space 19 flush with the respective adjacent fluid inlet 11 and fluid outlet 13, just like the bottom wall 21 forming a delimitation. In an embodiment not depicted in detail, the membrane can also be clamped at the edge for the fixation thereof in the housing.

When the fluid inlet 11 and fluid outlet 13 are each formed by a hole of 12 mm diameter in a practical exemplary embodiment, the disk-shaped hollow space 19 has a depth of 12 mm. In such an exemplary embodiment, the internal diameter of the hollow space 19 can be in the region of 100 mm, with an external diameter of the damping housing 1, outside of the flattenings 7, 9, of 160 mm, for example.

As FIGS. 8 and 9 show, the cover part 5 has a flange part 27 with fixing holes 29. The flange part 27 has the same contour as the base part 3, and is circular, apart from the flattenings 7 and 9, so that the interruption-free external shape is produced for the assembled overall device, as depicted in FIG. 2. The fixing holes 29 are, as FIG. 9 shows, provided on a partial circular arc outside of the region of the flattenings 7, 9. Corresponding to the fixing holes 29, threaded holes 31 are provided in the base part 3, which are formed as blind holes in the planar top side 33 of the base part 3 and which are provided for fixing screws 35 that penetrate the fixing holes 29, in order to fix the cover part 5 with its flange surface 37 at the top side 33 on the open side of the pot of the base part 3.

In the fixed state, the circular cylindrical engagement connection piece 39 extending coaxially from the flange surface 37 of the cover part 5 engages in the center recess 41 in the base part 3, which is delimited by the inner side wall 22 of the pot of the base part 3. This engagement in the screwed state is depicted in FIG. 3. The membrane 4 forms the top delimiting wall of the hollow space 19. For the sealing of the hollow space 19 relative to the cover part 5, a sealing ring 45 is inserted in an annular groove 43 incorporated in the side wall of the engagement connection piece 39. As FIG. 7 shows, at the flattening 7 assigned to the fluid inlet 11, an annular groove 47 is provided for a sealing element sealing at the connection point. A corresponding sealing arrangement can be provided in a corresponding manner on the flattening 9 assigned to the fluid outlet.

Due to the symmetrical housing construction, the inlet side and the outlet side can be exchanged possibly with changed sealing geometries. Due to the disk-shaped damping chamber with a cavity expanding transversely to the actual through-flow direction, a highly efficient silencer is achieved, which has little weight relative to its predefinable fluid volume. In addition, there is only a slight amplification, if any, between the silencer and a hydraulic pump that can be connected thereto.

While one embodiment has been chosen to illustrate the invention, it will be understood by those skilled in the art that various changes and modifications can be made therein without departing from the scope of the invention as defined in the claims.

The invention claimed is:
1. A damping device for damping pressure surges in hydraulic supply circuits, the damping device comprising:
   a damping housing having a pot-shaped base part with a fluid inlet, with a fluid outlet with a disk-shaped center recess and having a flange-shaped cover part with a protruding engagement connection piece engaging in said center recess, said cover part being fixed to said base part, said fluid inlet and said fluid outlet being coaxial;
   a fluid receiving chamber functioning as a damping chamber, being surrounded by said damping housing and extending between said fluid inlet and said fluid outlet, said fluid receiving chamber being capable of having a fluid flow cross said fluid receiving chamber in a through-flow direction from said fluid inlet to said fluid outlet during operation, parts of said fluid receiving chamber extending in an extension direction transverse to the through-flow direction, said fluid receiving chamber immediately adjoining said fluid inlet and said fluid outlet and being delimited by a flexible wall part and by a disk surface of said center recess defining a disk-shaped hollow space, said flexible wall part being opposite said disk surface with said hollow space being therebetween, said flexible wall part including a membrane spanning said hollow space from said fluid inlet to said fluid outlet, said membrane separating said fluid receiving chamber from an expansion chamber.

2. A damping device according to claim 1 wherein said membrane contacts a circumferential circular ring surface forming an inside end surface of said cover part.

3. A damping device according to claim 2 wherein said circular ring surface surrounds said expansion chamber, said expansion chamber being a depression in said cover part, said depression being concentric to a central axis of said fluid receiving chamber.

4. A damping device according to claim 1 wherein a support for said membrane is in said expansion chamber.

5. A damping device according to claim 4 wherein said support comprises a spring.

6. A damping device according to claim 4 wherein said support is a pressure cushion.

7. A damping device according to claim 6 wherein said support comprises a coupling connecting said pressure cushion in fluid communication to said fluid receiving chamber.

8. A damping device according to claim 5 wherein said spring is a compression spring supported on a mount in said cover part, a free end of said compression spring contacting said membrane.

9. A damping device according to claim 1 wherein said cover part comprises several throughholes diametrically opposite a central axis of said fluid receiving chamber, said throughholes receiving fixing screws fixing said cover part to said base part.

10. A damping device according to claim 9 wherein said fixing screws are spaced from said fluid inlet and said fluid outlet and are arranged uniformly along an external circumference of said damping housing.

11. A damping device according to claim 1 wherein at least one of said fluid inlet or said fluid outlet comprises a receptacle receiving a sealing ring therein that surrounds a respective one of said fluid inlet or fluid outlet.

12. A damping device according to claim 1 wherein said damping housing comprising fixing bolts protruding therefrom capable of being fixed to a fixing block on a hydraulic component, said fixing bolts surrounding at least one of said fluid inlet or said fluid outlet.

13. A damping device for damping pressure surges in hydraulic supply circuits, the damping device comprising:
   a housing base having a pot-shaped base part with a fluid inlet, a fluid outlet and a disk-shaped damping chamber extending continuously from said fluid inlet to said fluid outlet without an obstruction between said fluid inlet and said fluid outlet, said damping chamber being defined on a first side by a base surface of said housing base part, said fluid inlet and said fluid outlet being coaxial along a longitudinal axis, said damping chamber extending transverse relative to said longitudinal axis;
   a cover part being fixed to said housing base, having a connection piece with a ring surface facing in a direction of said damping chamber and having an expansion chamber opening in the direction of said damping chamber; and
   a flexible wall part extending over and completely covering said expansion chamber and extending from said fluid inlet to said fluid outlet, said flexible wall part having an inside end surface facing said damping chamber and defining a second side of said damping chamber opposite said first side of said damping chamber, said fluid inlet and said fluid outlet having equal cross-sectional diameters equal to a spacing of said base surface and said inner surface of said flexible wall part.

14. A damping device according to claim 13 wherein said flexible wall part is a membrane.

15. A damping device according to claim 13 wherein said membrane is fixed about a circumference thereof to a circumferential ring surface of said inside end surface of said cover part.

16. A damping device according to claim 15 wherein a support for said membrane is in said expansion chamber.

17. A damping device according to claim 16 wherein said support comprises a spring.

18. A damping device according to claim 16 wherein said support is a pressure cushion.

19. A damping device according to claim 17 wherein said support comprises a coupling connecting said pressure cushion in fluid communication to said fluid receiving chamber.

\* \* \* \* \*